(12) United States Patent
Liu et al.

(10) Patent No.: US 9,042,654 B2
(45) Date of Patent: May 26, 2015

(54) IMAGE RETRIEVAL APPARATUS

(71) Applicant: FUJITSU LIMITED, Kawasaki-shi, Kanagawa (JP)

(72) Inventors: Rujie Liu, Beijing (CN); Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP); Shigemi Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 13/854,575

(22) Filed: Apr. 1, 2013

(65) Prior Publication Data

US 2013/0230236 A1 Sep. 5, 2013

Related U.S. Application Data

(62) Division of application No. 12/149,015, filed on Apr. 24, 2008, now Pat. No. 8,433,137.

(30) Foreign Application Priority Data

Apr. 25, 2007 (CN) .......................... 2007 1 0104731

(51) Int. Cl.
*G06K 9/00* (2006.01)
*G06F 17/30* (2006.01)
(52) U.S. Cl.
CPC ................. *G06F 17/30247* (2013.01)
(58) Field of Classification Search
USPC .......................................... 382/159; 707/723
See application file for complete search history.

(56) References Cited

U.S. PATENT DOCUMENTS

| 5,678,046 | A | 10/1997 | Cahill et al. |
| 6,721,733 | B2 | 4/2004 | Lipson et al. |
| 6,859,802 | B1 | 2/2005 | Rui |
| 7,113,944 | B2 | 9/2006 | Zhang et al. |
| 2005/0131951 | A1 | 6/2005 | Zhang et al. |
| 2005/0210015 | A1 | 9/2005 | Zhou et al. |
| 2006/0010117 | A1 | 1/2006 | Bonabeau et al. |

FOREIGN PATENT DOCUMENTS

JP 2005-92866 4/2005

OTHER PUBLICATIONS

Japanese Office Action issued on Feb. 26, 2013 in corresponding Japanese Patent Application No. 2008-116000.

(Continued)

*Primary Examiner* — John Strege
(74) *Attorney, Agent, or Firm* — Staas & Halsey LLP

(57) ABSTRACT

Embodiments describe an image retrieval apparatus. The image retrieval apparatus includes an unlabelled image selector for selecting one or more unlabelled image(s) from an image database; and a main learner for training in each feedback round of the image retrieval, estimating relevance of images in the image database and a user's intention, and determining retrieval results, wherein the main learner makes use of the unlabelled image(s) selected by the unlabelled image selector in the estimation. In addition, the image retrieval apparatus may also include an active selector for selecting, in each feedback round and according to estimation results of the main learner, one or more unlabelled image(s) from the image database for the user to label.

12 Claims, 6 Drawing Sheets

(56) References Cited

OTHER PUBLICATIONS

Second Chinese Office Action issued Apr. 12, 2012 in corresponding Chinese Patent Application No. 200710104731.0.

Chinese Decision of Grant issued Aug. 31, 2012 in corresponding Chinese Patent Application No. 200710104731.0.

Notice of Allowance issued in copending U.S. Appl. No. 12/149,015 on Dec. 31, 2012.

Office Action issued in copending U.S. Appl. No. 12/149,015 on Jan. 17, 2012.

Office Action issued in copending U.S. Appl. No. 12/149,015 on Jul. 21, 2011.

Giorgio Giacinto et. al., "Bayesian Relevance Feedback for Content-Based Image Retrieval", Pattern Recognition, vol. 37, No. 7, pp. 1499-1508, 2004.

Ingemar J. Cox et. al. "The Bayesian Image Retrieval System, PicHunter: Theory, Implementation, and Psychophysical Experiments", IEEE Transactions on Image Processing, vol. 9, No. 1, pp. 20-37, 2000.

Ying Wu et. al., "Discriminant-EM Algorithm with Application to Image Retrieval", in Proc. IEEE Int'l Cont. on Computer Vision and Pattern Recognition, pp. 222-227, 2000.

Xiang Sean Zhou et. al., "Comparing Discriminating Transformations and SVM for Learning during Multimedia Retrieval", in Proc. ACM Multimedia, pp. 137-146, 2001.

Simon Tong et. al., "Support Vector Machine Active Learning for Image Retrieval", in Proc. ACM Multimedia, pp. 107-118, 2001.

Jingrui He et. al., "Mean Version Space: a New Active Learning Method for Content-Based Image Retrieval", in Proc. the 6th ACM SIGMM Int. Workshop on Multimedia Information Retrieval (MIR), pp. 15-22, 2004.

Lei Wang et. al., "Bootstrapping SVM Active Learning by Incorporating Unlabelled Images for Image Retrieval", in Proc. IEEE Int'l Cont. on Computer Vision and Pattern Recognition, pp. 629-634, 2003.

Klaus Brinker "Incorporating Diversity in Active Learning with Support Vector Machines", in Proc. of the $20^{th}$ Int'l Cont. on Machine Learning (ICML), pp. 59-66, 2003.

Zhi Hua Zhou "Enhancing Relevance Feedback in Image Retrieval Using Unlabeled Data", ACM Transactions on Information Systems, vol. 24, No. 2, pp. 219-244, 2006.

Jianbo Shi et. al., "Normalized Cuts and Image Segmentation", IEEE Transactions on Pattern Analysis and Machine Intelligence, vol. 22, No. 8, pp. 888-905, 2000.

Yong Rui, "Relevance Feedback: A Power Tool for Interactive Content-Based Image Retrieval", IEEE Transactions on Circuits and Video Technology, pp. 1-13.

U.S. Appl. No. 12/149,015, filed Apr. 24, 2008, Rujie Liu, et al., Fujitsu Limited.

Chinese Office Action issued Mar. 10, 2010 in corresponding Chinese Patent Application No. 200710104731.0.

Chinese Office Action issued Jun. 24, 2011 in corresponding Chinese Patent Application No. 200710104731.0.

Xing, "Color-based Feature Extraction and Matching Algorithms on Image Retrieval", Microcomputer Development; vol. 14, No. 2, Feb. 2004, pp. 42-44.

Duda et al., "Pattern Classification", Second Edition, China Machine Press, Copyright 2001, 95 pp.

IMAGE RETRIEVAL APPARATUS

CROSS REFERENCE TO RELATED APPLICATIONS

This application is a U.S. divisional application filed under 37 USC 1.53 claiming priority benefit of U.S. Ser. No. 12/149,015 filed in the United States on Apr. 24, 2008, which is based upon and claims the benefit of priority of the prior Chinese Patent Application No. 200710104731.0, filed Apr. 25, 2007, the disclosures of which are incorporated herein by reference.

FIELD OF THE INVENTION

Embodiments relate to an image retrieval apparatus, and more particularly to an apparatus for retrieving image content through active relevance feedback technology.

BACKGROUND OF THE RELATED ARTS

With the rapid development of the computer technology and the world-wide web, there has been an explosive tendency of increase in the amount and complexity of digital images in many areas of technologies. As a result, the challenges also increase in the effective and efficient management of this vast amount of images, such as accessing, organizing, retrieving, and so on. To meet such requirement, much attention has been put by researchers and scholars of various fields to content based image retrieval technology from the 90's of the last century, and many effective techniques and systems have been developed.

Image retrieval refers to a technology of the inquiry into a digital image database, so that the retrieved images can meet the user's intention. Traditional image retrieval systems allow users to search for image databases in either of two ways: keyword based retrieval, and content based retrieval.

In keyword based retrieval, the images in the database are labeled in advance, that is to say, the images are described with keywords. The retrieval is then carried out in accordance with the keywords of the images. However, there are two major problems associated with this mode of retrieval: (1) one is the enormous burden required in manually labeling the images, and this is more apparent when the size of the database is large; and (2) what is more serious is the usual inconsistency between the image content and the individual comprehension. In other words, different individuals have different points of interests with regard to the same image, and the comprehensions and intentions of the different individuals are also different.

The concept of content based image retrieval was proposed in the 90's of the last century to address the problems existent in the keyword based retrieval systems. In contrast to the mode of keyword based retrieval, a content based retrieval system retrieves an image directly based on the image content. In such a system, a user is required to provide a query image to express his intention, and the retrieval system subsequently retrieves the image database to find images similar to the query image and returns them to the user. To achieve this goal, the retrieval system usually first extracts from the query image and the database images such low-level features as colors, textures and shapes. The distance between the query image and the database images is then calculated based on these features to determine their similarity. And finally, the database images most similar to the query image are returned. If the features of the images can fitly describe the image content, such a mode of retrieval is very effective. For instance, if a user intends to retrieve images having specific colors and complicated textures, the content based retrieval system can perfectly carry out the task by using the features of the colors and the textures. To the contrary, this goal can hardly be achieved by describing with keywords.

Nevertheless, application of the content based image retrieval is largely limited by the difference between the low-level features of the image and the high-level conceptualization of human perception. First, the effectiveness of the content based image retrieval system usually depends on the features adopted. For example, features relevant to the shape is relatively effective in the case of retrieving the images of "cars", whereas it is more reasonable to describe with features relevant to colors with regard to a scenic image of "sunset". Therefore, different strategies should be employed in retrieving images of different types, but it is difficult for a nonprofessional user to determine as to which features are relatively more effective. In addition, different users have different points of interests at different times even with regard to the same image. In other words, perceptual similarities are associated with such factors as the environments of application, the individuals involved and the contexts.

In order to reduce the difference between the low-level features and the high-level perception, researchers have proposed a strategy of relevance feedback, and achieved considerable success in this regard. An image retrieval system equipped with the relevance feedback enhances the precision of the retrieval through interactions between a retrieval engine and a user. Such a system should contain at least two modules: a learner module and a selector module. In each round of the feedback, the user is required to provide some feedback information, that is, to judge the images returned by the selector module and mark them either as relevant or irrelevant (the relevant images and the irrelevant images are respectively referred to as positive samples and negative samples); the learner module learns again the user's intention based on the feedback information, and returns new retrieval result. At the same time, the selector module selects some images from the image database based on the current learning result, and returns them to the user via a user interface. During the next round of feedback, the user will be required to provide feedback information on these images.

Many relevance feedback methods have been developed in the past decade along the path from heuristic strategy to optimized learning. Most early relevance feedback methods pertain to the category of "Query Point Movement and Re-weighting", for which the task of the search engine consists in, at each round of the feedback procedure, generating better query features and reasonably adjusting the weights of various features to better adapt to the user's intention.

[Patent document-1] is one of the earlier image retrieval apparatuses based on the strategy of "Query Point Movement and Re-weighting". In this apparatus a weighted average of the features of the relevant images (positive samples) obtained via feedback is taken as a new query point. At the same time, this apparatus makes use of a re-weighting strategy based on standard variance.

Some existing retrieval systems use a Bayesian method to carry out "Query Point Movement and Re-weighting". [Patent document-2] makes use of a Bayesian classifier to differentiate the relevant images and the irrelevant images obtained via feedback. The relevant images (positive samples) are regarded in this method as belonging to the same semantic class, and their distributions are estimated by means of the Bayesian classifier. By contrast, the irrelevant images (negative samples) are usually irrelevant in semantics. Consequently, images surrounding the negative samples are penalized through a "dibbling" process.

[Non-patent document-1] employs the Bayesian theory to estimate the local decision boundary of the positive samples and negative samples surrounding the query image, and calculates a proper location in the region of the positive samples as a new query point.

Given the feedback information of a user, [non-patent document-2] employs the Bayesian theory to estimate the intention of the user. Specifically, a posterior probability distribution of all images in the database is estimated, and the probability distribution is updated in accordance with the result of each retrieval feedback.

Later on, researchers began to look at the relevance feedback problem more systematically by formulating it into problems of learning, classification, or probability density estimation. Refer to [non-patent document-3], the Discriminant EM method casts image retrieval as a transductive learning problem by using unlabelled images in supervised learning to achieve better classification result. However, the computational complexity of this method is high, and it is troublesome especially when the database is large.

Based on the observations that all positive samples are alike and each negative sample is negative in its own way, Zhou and Huang proposed in [non-patent document-4] a biased discriminant analysis and its kernel form, to find a better transformed space, where the positive samples cluster while the negative samples scatter away from the positive samples.

Recently, many relevance feedback technologies rely on support vector machines (shortened as SVM), such as the methods described in [non-patent document-5], [non-patent document-6] and [non-patent document-7]. Compared with other learning methods, SVM has many advantages, such as for instance, good generalization ability; without restrictive assumptions regarding the object to be processed; fast learning and predicting speed; and flexibility, etc.

However, these learning methods are challenged by the problem of small sample size, namely the problem of insufficient training samples. This is because few users will be so patient as to label a large number of images in the relevance feedback process. Therefore, given the number of the images to be labeled, how to choose images for the user to label is a crucial issue in minimizing the amount of interaction between the user and the learner required for reaching good results. Generally speaking, two strategies are used to address the problem of insufficient training samples: (1) active learning, or active selecting; (2) exploiting unlabelled images.

Active learning strategy usually employs a selector module to actively select images from the image database for the user to label and feed back, in order to achieve the maximal information gain in decision making and feedback. Such a method is presented in [non-patent document-5]. They proposed that the selected images should maximally reduce the size of the version space, which can be achieved by selecting the points nearest to the decision boundary. Another conventional method is the angle-diversity strategy, as shown in [non-patent document-8]. This method achieves the objective of simultaneously selecting a plurality of samples by balancing the distance between the image samples and the decision boundary as well as the angles between these samples.

In order to address the problem of insufficient training samples, it has become a hot topic of research in the past few years to acquire information from unlabelled images. The basic principle of this strategy is to enhance accuracy of classification through the unlabelled images. Some methods use a generative model for the classifier and employ EM scheme to model the label or parameter estimation process, while others yields an optimal labeling of the unlabelled examples by using the minimum cut on the graph. Another prominent achievement of acquiring information from unlabelled images is the co-training strategy, which trains two different classifiers from two different angles of perspective, and makes use of the prediction result of the one classifier on the unlabelled images to augment a training collection of another classifier, as shown in [non-patent document-9].

[Patent document-1]: U.S. Pat. No. 6,859,802 B1
[Patent document-2]: U.S. Pat. No. 7,113,944 B2
[Non-patent document-1]: Giorgio Giacinto, Fabio Roli, Bayesian Relevance Feedback for Content-Based Image Retrieval, Pattern Recognition, vol. 37, no. 7, pp. 1499-1508, 2004.
[Non-patent document-2]: Ingemar J. Cox, Matt L. Miller, Thomas P. Minka, Thomas V. Papathomas, Peter N. Yianilos, The Bayesian Image Retrieval System, PicHunter: Theory, Implementation, and Psychophysical Experiments, IEEE Transactions on Image Processing, vol. 9, no. 1, pp. 20-37, 2000.
[Non-patent document-3]: Ying Wu, Qi Tian, Thomas S. Huang, Discriminant-EM Algorithm with Application to Image Retrieval, in Proc. IEEE Intl Conf. on Computer Vision and Pattern Recognition, pp. 222-227, 2000.
[Non-patent document-4]: Xiang Sean Zhou, Thomas S. Huang, Comparing Discriminating Transformations and SVM for Learning during Multimedia Retrieval, in Proc. ACM Multimedia, pp. 137-146, 2001.
[Non-patent document-5]: Simon Tong, Edward Chang, Support Vector Machine Active Learning for Image Retrieval, in Proc. ACM Multimedia, pp. 107-118, 2001.
[Non-patent document-6]: Jingrui He, Mingjing Li, Hong-Jiang Zhang, Hanghang Tong, Changshui Zhang, Mean Version Space: a New Active Learning Method for Content-Based Image Retrieval, in Proc. the 6th ACM SIGMM Int. Workshop on Multimedia Information Retrieval (MIR), pp. 15-22, 2004.
[Non-patent document-7]: Lei Wang, Kap Luk Chan, Zhihua Zhang, Bootstrapping SVM Active Learning by Incorporating Unlabelled Images for Image Retrieval, in Proc. IEEE Int/Conf. on Computer Vision and Pattern Recognition, pp. 629-634, 2003.
[Non-patent document-8]: Klaus Brinker, Incorporating Diversity in Active Learning with Support Vector Machines, in Proc. of the $20^{th}$ Intl Conf. on Machine Learning (ICML), pp. 59-66, 2003.
[Non-patent document-9]: Zhi Hua Zhou, Enhancing Relevance Feedback in Image Retrieval Using Unlabeled Data, ACM Transactions on Information Systems, vol. 24, no. 2, pp. 219-244, 2006.
[Non-patent document-10]: Jianbo Shi, Jitendra Malik, Normalized Cuts and Image Segmentation, IEEE Transactions on Pattern Analysis and Machine Intelligence, vol. 22, no. 8, pp. 888-905, 2000.
[Non-patent document-11]: translated by Hongdong LI, and Tianxiang YAO et al., Mode Classification, Publishing House of Machinery Industry, Zhongxin Publishing House, pages 415-477.

SUMMARY

Embodiments described include an image retrieval apparatus and an image retrieval method to solve one or more problems due to restrictions and defects in the state of the art, and at least, to provide one advantageous choice.

According to one embodiment, there is provided an image retrieval apparatus, which comprises an unlabelled image selector for selecting one or more unlabelled image(s) from an image database; and a main learner for training in each feedback round of the image retrieval, estimating relevance of images in the image database and a user's intention, and determining retrieval results, wherein the main learner makes use of the unlabelled image(s) selected by the unlabelled image selector in the estimation.

According to another embodiment, there is provided an image retrieval apparatus, which comprises a main learner for training in each feedback round of the image retrieval, estimating relevance of images in an image database and a user's intention, and determining retrieval results; an active selector for selecting, in each feedback round and according to estimation results of the main learner, one or more unlabelled image(s) from the image database for the user to label; and an output unit for outputting the retrieval results determined by the main learner and the one or more unlabelled image(s) selected by the active selector.

According to the image retrieval apparatus of an exemplary embodiment, the number of training samples can be increased, so that the performance of the image retrieval can be enhanced.

BRIEF DESCRIPTION OF THE DRAWINGS

The accompanying drawings included herein provide further understanding with respect to exemplary embodiments of the disclosure, and they are incorporated into the Description and constitute a part thereof. The drawings describe the embodiments, and explain the principle of this invention together with the Description. In the drawings.

DETAILED DESCRIPTION OF EMBODIMENTS

Figure 1:
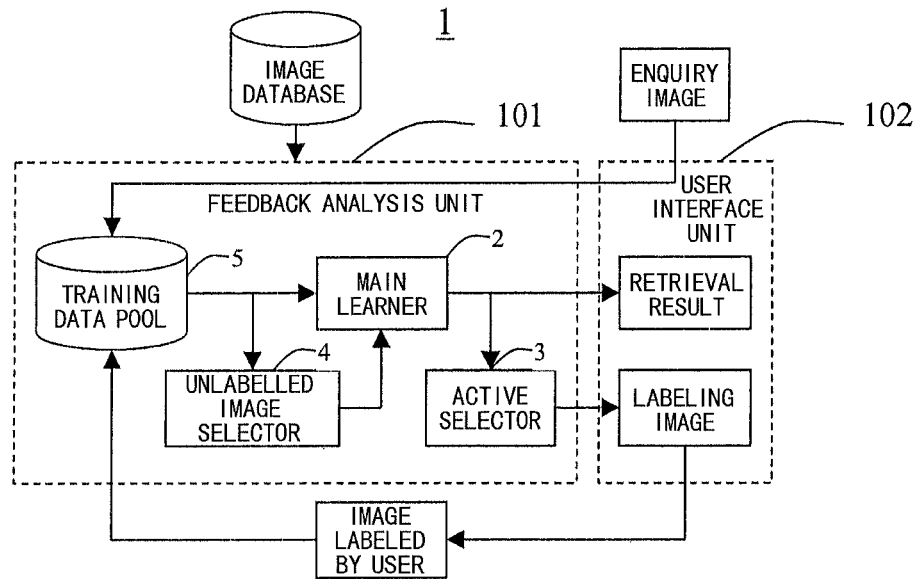
FIG. 1 shows the structure of an image retrieval apparatus according to one embodiment of this invention.

FIG. 1 shows the structure of an image retrieval apparatus according to one embodiment of this invention. As shown in FIG. 1, the image retrieval apparatus 1 comprises a feedback analysis unit 101 and a user interface unit 102. Interaction with the user is carried out via the user interface unit 102: retrieval result is returned to the user via the user interface unit 102 in each round of retrieval feedback. In one embodiment, the interface is equipped with a navigating tool to make it easy for the user to browse large quantities of images. In addition, the interface displays to the user images outputted from the active selector, and accepts from the user labels made to these images. For instance, the user interface unit can be a display (such as a liquid crystal display device, a plasma display device, an electroluminescent display device, a CRT display device, etc.), a mouse, a keyboard, a touch panel or a combination of these.

The feedback analysis unit 101 is the main processing module of the image retrieval apparatus 1, and consists of four units, namely a main learner 2, an active selector 3, an unlabelled image selector 4 and a training data pool 5.

The training data pool 5 is a storage unit that records the enquiry image inputted by the user and images labeled by the user during the process of feedback as well as the labels of these images (positive samples or negative samples). When a retrieval task begins, the unit only contains the enquiry image inputted by the user, while images labeled by the user are subsequently stored with the ongoing feedback process.

The unlabelled image selector 4 selects unlabelled images to increase the collection of training samples of the main learner 2 by selecting most confident negative samples as unlabelled images to provide to the main learner 2 in accordance with a certain algorithm (classifier) and based on the images in the training data pool 5.

The main learner 2 is the main classifying module in the retrieval apparatus. Any classifier can be used as the main learner, such as an SVM, a Bayesian classifier, a most adjacent classifier, a BP neuronetwork classifier etc. The classifier is a classifying module that differentiates the class of an object under test by assigning a classifying label to it. In general cases, the classifier includes three parts, namely an input, an output and an information processing module. The classifier accepts via input the information of the object under test, processes the input information by means of the information processing module, and finally outputs the label of the object. Taking for example a classifier designed to differentiate the gender of a person in a photo, the input thereof is the photo of the person or a feature extracted from the photo, and the gender, namely male or female, of the person in the photo is then outputted after processing. The classifier is a general term in this field of technology, and can be understood to mean either an algorithm employed therein or a device implementing the classifier in the context of this invention, directed in both cases to facilitating comprehension of this invention by a person ordinarily skilled in the art. Additionally, in this invention according to the context, training of the classifier is sometimes equivalent to training of the device (such as the main learner) employing the classifier. In each round of feedback, the main learner 2 retrains itself by using the images stored in the training data pool and the images of negative samples outputted by the unlabelled image selector 4; subsequently, the main learner estimates all of the unlabelled images in the image database, namely judging the degree of similarity of these images with regard to the user's intention; and finally, the estimation result of the main learner is returned to the user via the user interface, namely by displaying the result on the user interface according to the degree of similarity between the images in the image database and the user's intention.

In accordance with the current estimation result of the main learner 2, the active selector 3 selects an image having high information capacity and representativeness, and returns the image to the user via the user interface for labeling.

If the user is satisfied with the current retrieval result, that is to say, the user is capable of finding a satisfactory target image from the retrieval result, he can stop the retrieval process; otherwise, the user needs to label the images outputted from the active selector to enter the next round of feedback.

Figure 2:
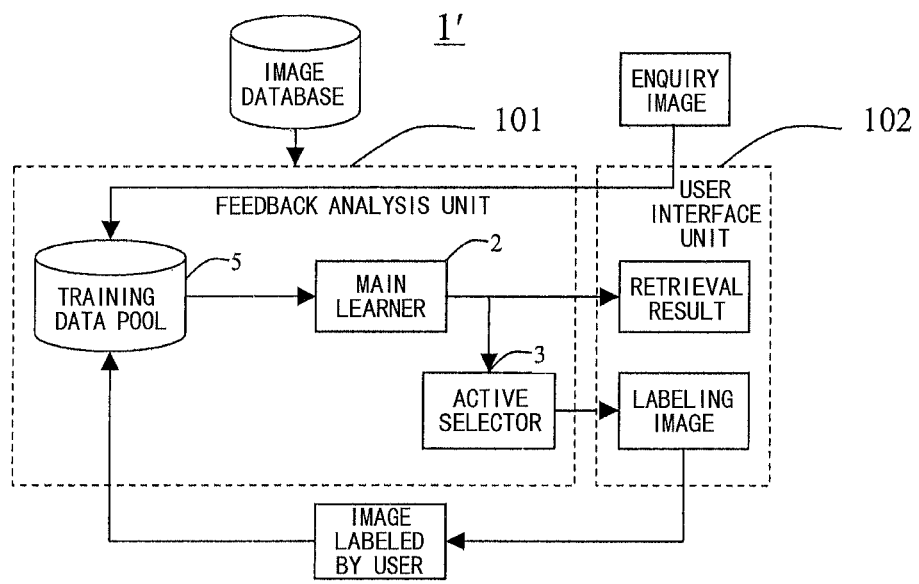
FIG. 2 shows the structure of an image retrieval apparatus according to another embodiment of this invention.
Figure 3:
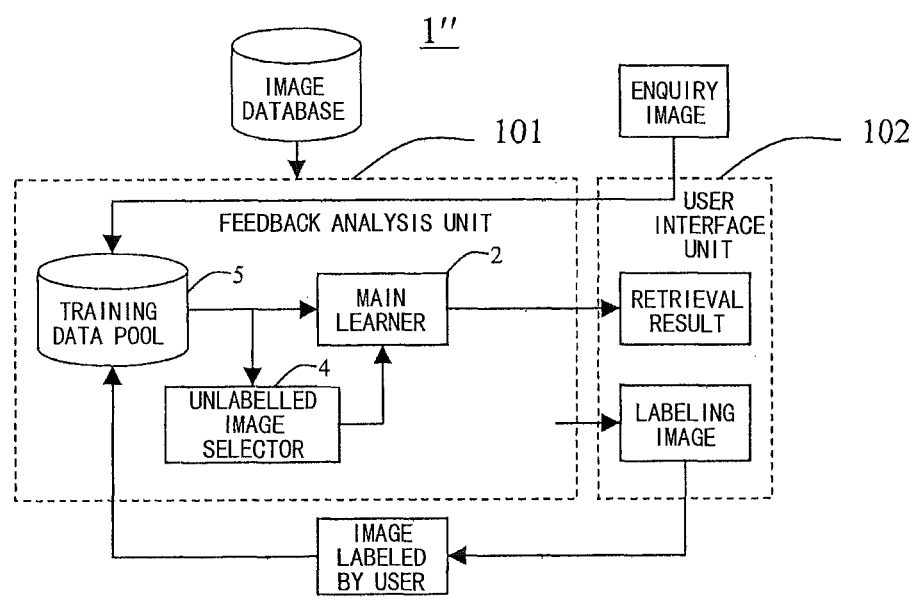
FIG. 3 shows the structure of an image retrieval apparatus according to still another embodiment of this invention.

FIG. 2 shows the structure of an image retrieval apparatus according to another embodiment of this invention, and FIG. 3 shows the structure of an image retrieval apparatus according to still another embodiment of this invention. The image retrieval apparatus 1' as shown in FIG. 2 differs from the image retrieval apparatus 1 as shown in FIG. 1, in the fact that, it does not include the unlabelled image selector. The image retrieval apparatus 1" as shown in FIG. 3 differs from the image retrieval apparatus 1 as shown in FIG. 1, in the fact that, it does not include the active selector. The user needs to label some images during the process of feedback. In the existence of the active selector, the user labels the images outputted from the active selector, whereas in the absence of the active selector, the user can randomly select some images for labeling. The remaining aspects of the image retrieval apparatus are identical with those of the image retrieval apparatus 1 as shown in FIG. 1.

The active selector and the unlabelled image selector according to this invention are described in greater detail in paragraphs that follow.

1. Active Selector

In each round of feedback, the active selector 3 selects, in accordance with the estimation result of the main learner 2, some unlabelled images from the image database for the user to label. In order to acquire as much information as possible, two measurements are used during selection of the images: information capacity measurement and representativeness measurement. It is also possible to use one of these two measurements, but the performance of the claimed apparatus will be more or less affected in such a case. In addition, these two measurements are only exemplary in nature, as it is also possible for a person skilled in the art to use other measurements, insofar as these measurements can acquire much information. For example, selection of an image outputted from the main learner and most relevant to the user's intention is referred to as the most relevance measurement.

Figure 4:
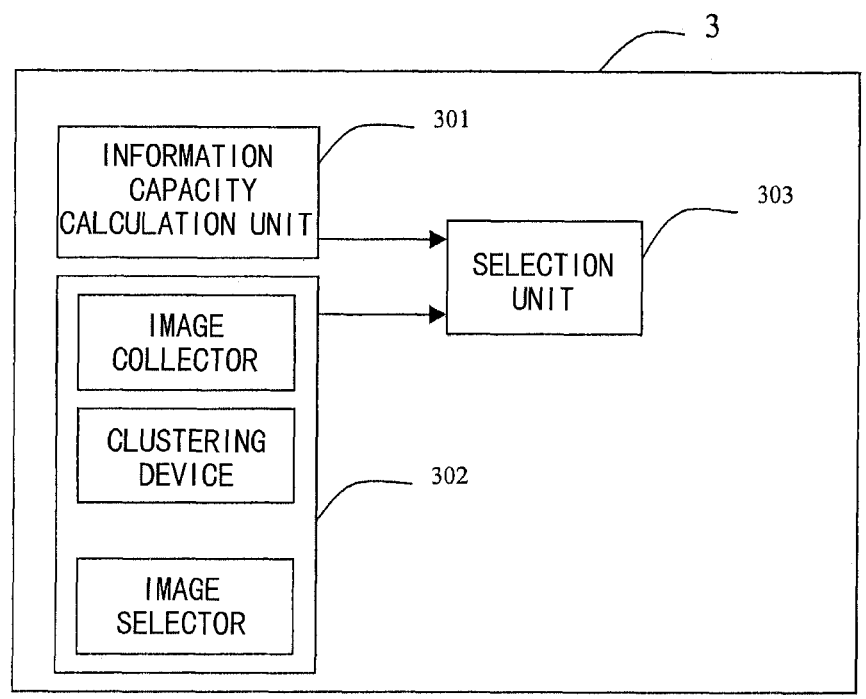
FIG. 4 shows the structure of an active selector in an image retrieval apparatus according to one embodiment of this invention.

FIG. 4 shows the structure of an active selector 3 according to one embodiment of this invention. As shown in FIG. 4, the active selector 3 includes an information capacity measurement calculation unit 301, a representativeness measurement calculation unit 302 and a selection unit 303, of which the representativeness measurement calculation unit 302 further includes an image collector, a clustering device and an image selector. Be noted that this embodiment is only exemplary in nature, as, for instance, the information capacity measurement calculation unit 301 can be omitted in the case of using the representativeness measurement alone, and the representativeness measurement calculation unit 302 can be omitted in the case of using the information capacity measurement alone.

1.1 Information Capacity Measurement

The information capacity measurement calculation unit 301 calculates the information capacity measurement. Let C indicate user's intention in the following description. The term of "user's intention" is used only to facilitate the description. "User's intention" means which image(s) the user intends to retrieve, in other words, it means the user's target. This "C" cannot be definitely acquired, and the objective of the retrieval system is to estimate the intention as far as practically exact. According to the current estimation (namely the estimated relevant probability of an image with regard to C) of the main learner, suppose the relevant probability of an image x with regard to C is $p(C|x)$. Starting from the perspective of information theory, the information capacity contained in the image x can be measured via entropy, namely:

$$En(x) = -p(C|x)\log p(C|x) - p(\overline{C}|x)\log p(\overline{C}|x), \qquad [1]$$

In this equation, $p(\overline{C}|x) = 1 - p(C|x)$ indicates the irrelevant probability of x with regard to C. When $p(C|x) = 0.5$, the value of the entropy $En(x)$ is at maximum, indicating that the attribute of the image x is indefinite, that is, it is totally impossible to determine whether x is relevant or irrelevant to C. In addition, the closer the value of $p(C|x)$ is to 0.5, the greater the value of $En(x)$ is. It should be noted that the value of the entropy $En(x)$ varies with the $p(C|x)$ as follows: when $p(C|x)$ increases from 0 to 1, the value of the entropy $En(x)$ first increases and then decreases. When $p(C|x) = 0.5$, the value of the entropy $En(x)$ is at maximum. If the $p(C|x)$ acquired from the classifier (main learner 2) genuinely represents the probability as noted above, 0.5 should be used as the classification boundary. Of course, what is outputted by some classifiers (main learner 2) is not the genuine probability, and the classification boundary may therefore not be 0.5.

Suppose $p(C|x) = 0.5$ is regarded as the classification boundary of a main classifier, the strategy of selecting images in accordance with the information capacity measurement becomes as follows: the closer an image approaches the classification boundary, the larger the information capacity of this image is, and the greater the chance for this image to be selected will be.

For instance, if an SVM classifier is used as the main learner, certain existing methods can be employed to carry out the information capacity measurement. As one of the existing methods, [non-patent document-5] describes a strategy based on solution space. This method regards image selection as a searching problem for solution space. A better way to carry out the strategy is to select an image capable of halving the solution space, so as to quickly decrease the size of the solution space. In practical operation, the distance between each image and the center of the solution space can be checked: the closer an image is distanced from the center of the solution space, the higher the possibility whereby the image halves the solution space will be. The center of the solution space can be approximated by the classification boundary of the SVM classifier, so that the aforementioned strategy is changed to select the image that is distanced closest to the current classification boundary. Therefore, the strategy as described in [non-patent document-5] is consistent with the measurement based on the entropy according to this invention.

1.2 Representativeness Measurement

The representativeness measurement calculation unit 302 calculates the representativeness measurement. In one embodiment of this invention, a clustering process is employed to decrease the information redundancy of the selected images, so as to enhance the representativeness of the selected images. In each round of feedback, a non-supervised clustering process is first employed to cluster the unlabelled images in the vicinity of the classification boundary of the main learner and the images in the training data pool, and one image is then selected from each cluster that does not contain the already labeled images for the user to label. Through this process, each of the selected images represents a small eigenspace, and they therefore have stronger representativeness. Since both the clustering and the selection are directed to the images in the vicinity of the classification boundary, the information capacities of these images are ensured.

Figure 5:
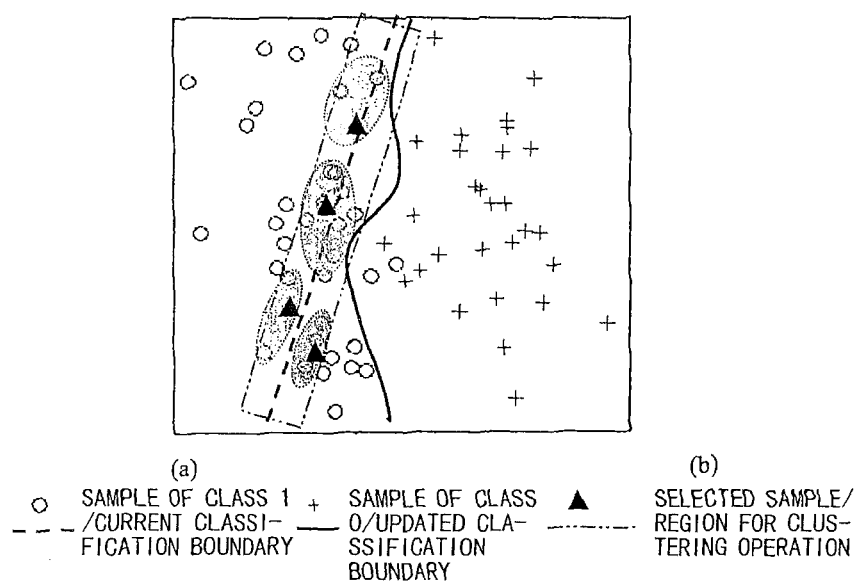
FIG. 5 is a basic diagram showing representativeness measurement.

FIG. 5 is a basic diagram showing the representativeness measurement. Being a classification diagram of two classes of data, FIG. 5 provides the basic principle of the representativeness measurement, wherein the two classes of data are indicated by "+" and "o", respectively. In FIG. 5, the dashed line represents the current classification boundary of the main learner; as can be seen, a serious classification error occurs, that is to say, some samples labeled with "o" are classified into the other class. The image collector in the active selector 3 first selects the data distanced closer to the classification boundary, as shown by the rectangular with dotted-lines in the figure; subsequently, the clustering device in the active selector 3 clusters these data by means of a non-supervised clustering process, whereby altogether four clusters are obtained, as shown by the ellipse with dotted-lines in FIG. 5; and finally, the image selector in the active selector 3 selects one representative data, such as the one shown by the solid triangle in the figure, from each cluster acquired by the clustering device.

In the selection of the data distanced closer to the classification boundary, the number of the images to be selected is first determined. This number is determined according to practical application, and generally determined in advance according to experience. For instance, the number may be 100, 150, and 180, etc. Of course, if the number is too large, the information capacity measurement might be decreased, whereas if the number is too small, the representativeness measurement might be decreased. Moreover, this number is also associated with the number of the images in the image database. When the number is determined, the selection is made relatively easy. For instance, if what is outputted by the main learner is the probability, 0.5 is the classification boundary, so that the closer the probability of an image approaches 0.5, the more is the likelihood that this image should be selected. In other words, the value difference between the probability of each image and 0.5 is calculated, and those portions with less value difference are selected.

Certain existing methods can be employed to carry out the aforementioned clustering process, such as the Normalized Cut Method (see [non-patent document-10]), the K-Mean Method, and the Hierarchical Clustering Method (for which refer to [non-patent document-11]).

The normalized cut method is briefly discussed below.

Given the images to be clustered, an undirected total connection graph G=(V,E) is first constructed, where each node of the graph corresponds to one image. The weighted value of edges represents the similarity between two nodes of the graph; given the nodes i and j of the graph, the weighted value $w_{i,j}$ of the edge connecting these two nodes is defined as follows:

$$w_{ij}=e^{-(d(i,j)/\sigma)^2} \quad [2]$$

where d(i, j) denotes the Euclidean distance between images i and j, σ is a scaling parameter, which can be set to 10 to 20 percent of the maximal distance between the images.

Generally speaking, the objective of the normalized cut method is to organize the nodes into two groups, so that the similarity inside one group is relatively high, whereas the similarity between groups is relatively low. Suppose the nodes in the graph G are organized into two disjoint collections A and B, and let it be satisfied that A∩B=V and A∪B=∅, the success of the grouping can be measured by means of the total weighted value of the edges connecting the two collections. This is referred to as "cut" in the graph theory:

$$cut(A, B) = \sum_{u \in A, v \in B} w_{uv} \quad [3]$$

where cut(A,B) is the total weighted value of the edges connecting the nodes in the collection A and the nodes in the collection B. To avoid biased results, success of the normalized cut method is measured by the following measurement:

$$Ncut(A, B) = \frac{cut(A, B)}{assoc(A, V)} + \frac{cut(A, B)}{assoc(B, V)} \quad [4]$$

where assoc(A,V)=$\Sigma_{u \in A, t \in V} W_{ut}$ is the total weighted value of the connection between the nodes in the collection A and all of the nodes in the graph, and definition to assoc(B,V) is similar thereto.

The smaller the value of Ncut is, the better the corresponding grouping will be. The smallest value of Ncut can be acquired by solving the problem of the following extended eigenvalue.

$$(D-W)y=\lambda Dy \quad [5]$$

where W is a symmetric matrix with W(i, j)=$w_{ij}$, and D is a diagonal matrix with d(i)=$\Sigma_j w_{ij}$. In addition, λ is a publicly known parameter in solving the problem of the eigenvalue, and no detailed explanation is made thereto in this paper.

After solving the problem of the aforementioned extended eigenvalue, the eigenvector to which the second smallest eigenvalue corresponds is the optimal grouping.

In this invention the average value of the eigenvector to which the second smallest eigenvalue corresponds is used as the cutting point. In the eigenvector, if the value of a certain element is greater than the cutting point, the image (node) corresponding thereto is grouped in the collection A; otherwise, the image (node) corresponding thereto is grouped in the collection B.

The clustering process is achieved by recursively performing the normalized cut, namely cutting the collections of nodes into smaller sub-collections by continuously applying the normalized cut. However, two issues should be addressed during the process: (1) which sub-collection should be operated during each application of the normalized cut? And (2) how is the number of the clusters determined, in other words, when is the clustering process stopped?

As regards the first problem, this invention employs a simple method, namely selecting the sub-collection having the greatest number of nodes to group each time.

As regards the second problem, the following strategy is employed to control the clustering process: the clustering and cutting process is repeated, until the number of clusters not containing the already labeled images and the enquiry image(s) equals to the number of the images returned to the user for labeling.

Moreover, the clusters containing the already labeled images or the enquiry image(s) are regarded to be capable of represented by the already labeled images or the enquiry image(s) contained therein, so that this invention merely selects the representative images from the clusters not containing the already labeled images and the enquiry image(s), and returns them to the user for labeling.

In each round of feedback, the aforementioned clustering process can be summarized as follows:

Let I=$I_N$+$I_L$+$I_Q$ represent images participating the clustering, where $I_N$ denotes N number of images distanced closest to the current classification boundary of the main learner, $I_L$ denotes the images in the training data pool, $I_Q$ denotes the enquiry image, and T denotes the number of the images returned to the user for labeling.

(1) Set an initial cluster $c_0$=t; t=0.
(2) Select the cluster $c_i$ with the greatest number of nodes, and divide it into two sub-collections $c_m$ and $c_n$ by means of the normalized cut method.
(3) Delete $c_i$ from the cluster list, and add $c_m$ and $c_n$ to the cluster list.

(4) Set t to t+1 if any one of the following conditions is met:
 a) $c_i$ does not contain the already labeled images and the enquiry image;
 b) $c_i$ contains the already labeled images or the enquiry image, but $c_m$ or $c_n$ does not contain the already labeled images and the enquiry image.

(5) Go to step (2) if t is smaller than T; otherwise, stop the clustering process.

1.3 Combined Strategy

Suppose $c=\{x_1, \ldots, x_M\}$ represents a cluster consisting of M number of images acquired by the aforementioned process, and does not contain the already labeled images and the enquiry image. The representativeness measurement of each image in the cluster is as follows:

$$\text{Rep}(x_i) = \rho_{j \in c} w_{ij} \quad [6]$$

The information capacity measurement of each image is as follows:

$$\text{Inf}(x_i) = |\text{En}(x_i)| \quad [7]$$

If the main learner employs the support vector machine (SVM) as the classifier, the information capacity measurement can also be denoted as follows:
$\text{Inf}(x_i) = |g(x_i)|$, where $g(x)$ represents the predictive output of the SVM classifier with regard to the image.

The two measurements are integrated together to obtain the final score of the image $x_i$:

$$s(x_i) = \lambda \text{Inf}(x_i) + (1-\lambda) \text{Rep}(x_i) \quad [8]$$

where, the parameter $\lambda$ controls the contribution ratio of the two measurements.

The equation [8] is used to calculate the final scores of all images in the cluster c, and the image having the highest score is selected to be returned to the user for labeling.

The aforementioned weighting method is only exemplary in nature, as other methods can also be employed, for instance, by multiplying the values of the two measurements and adding the weighted values after squaring them, etc.

2. Unlabelled Image Selector

Figure 6:
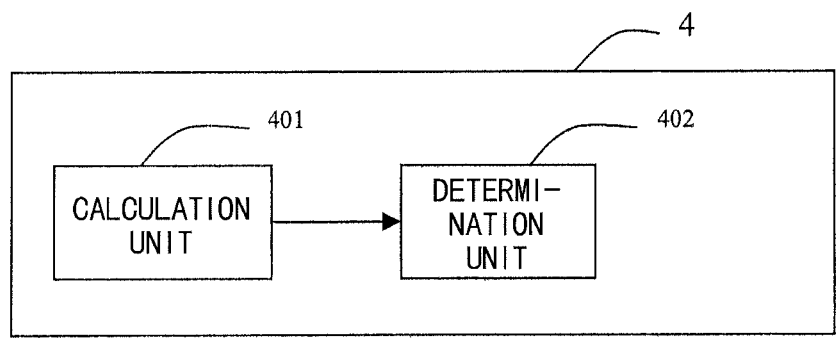
FIG. 6 is a diagram showing an embodiment of an unlabelled image selector according to this invention.
Figure 7:
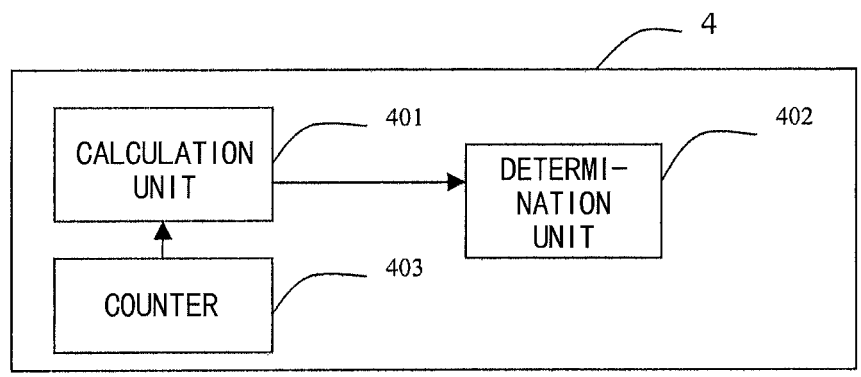
FIG. 7 is a diagram showing another embodiment of the unlabelled image selector according to this invention.

The unlabelled image selector is explained in details below with reference to FIGS. 6 and 7. FIG. 6 is a diagram showing an embodiment of the unlabelled image selector according to this invention, and FIG. 7 is a diagram showing another embodiment of the unlabelled image selector according to this invention.

As shown in FIG. 6, the unlabelled image selector includes a calculation unit 401 and a determination unit 402. In each round of feedback, the calculation unit 401 of the unlabelled image selector 4 employs a classifier (algorithm) different from the one employed by the main learner to calculate the degree of relevance between the unlabelled images in the image database and the user's intention. The determination unit 402 selects the most irrelevant unlabelled images as negative samples to provide to the main learner in accordance with the calculation result of the calculation unit 401.

The determination unit 402 may select a predetermined number of unlabelled images that are most irrelevant to the user's intention as negative samples to provide to the main learner. As an alternative, it is also possible to select the unlabelled images whose degree of irrelevance to the user's intention is greater than a predetermined threshold value as negative samples to provide to the main learner.

As should be noted, in one embodiment of this invention, the calculation unit 401 performs calculation in each round, thereby enhancing reliability. However, it is not necessary to recalculate and determine each time the unlabelled images to be provided to the main learner as negative samples. For example, the calculation and determination may also be performed only once, but the performance will deteriorate as a result. It is also possible to perform the calculation and determination in predetermined rounds of feedback (for instance, every 5 rounds or every 10 rounds). It is still possible to perform the calculation and determination according to a certain algorithm (for instance, the intervals for performing the calculation and determination become increasingly greater or lesser with the increase in the rounds of feedback). Although the performance will be even worse as a result, the speed is increased thereby. Under the circumstance the rounds of feedback are taken into consideration, as shown in FIG. 7, the unlabelled image selector further includes a counter 403, to count the rounds of feedback and input the rounds as counted into the calculation unit 401, which determines whether to perform the calculation based on the rounds.

When the main learner is retrained during the feedback process, the unlabelled images selected also participate therein as negative samples.

The operating processes of the calculation unit 401 and the determination unit 402 are explained in details in the following paragraphs.

Let L and U denote respectively the unlabelled images in the training data pool and those in the image database, of which the training data pool contains the already labeled images in the image database and the inputted enquiry image. At the beginning of the retrieval, L merely contains the enquiry image inputted by the user, while U contains all images in the image database. During the subsequent feedback process, images newly labeled by the user are incessantly added into L. In each round of feedback (or in other embodiments, in the feedback requiring calculation), the calculation unit 401 estimates, in accordance with the images in L, the images in U by employing a classifier (algorithm) different from the one employed by the main classifier. Finally, the determination unit 402 selects the images that are most irrelevant to the user's intention according to certain rules (as those discussed above) and outputs them to the main learner, and these images augment the training data collection of the main learner as negative samples.

However, as should be noted here, the training pool images are consistent with the images used by the calculation unit 401 for training, but they are not completely consistent with the images used by the main learner for training. The images used by the main learner for training further include the unlabelled images outputted by the unlabelled image selector.

To satisfy the real-time requirement of image retrieval, in one embodiment of this invention the calculation unit employs a simple model to perform the calculation. This model is the weighted Euclidean distance model. Be noted that the algorithm (or model) is only exemplary in nature, as such other methods as the aforementioned Bayesian classifier or BP neuronetwork classifier, etc., can also be employed, insofar as they are different from the classifier employed by the main learner.

Refer to the following document for the weighted Euclidean distance model: Yong Rui, Thomas S. Huang, Michael Ortega, Sharad Mehrotra, Relevance Feedback: A Power Tool for Interactive Content-Based Image Retrieval, IEEE Transactions on Circuits and Video Technology, Vol. 8, No. 5, pp. 644-655, 1998. Brief introduction follows.

As shown below:

$$f(x) = \text{dist}(x,q) = (\Sigma_{i=1}^{d}(x^i - q^i)^2 * w^i)^{1/2} \quad [9]$$

where x and p are respectively an unlabelled image and an enquiry point, which is an eigenvector used to substitute for the eigenvector to which the enquiry image corresponds so as to better describe the user's intention. Both of them are expressed as d-dimensional vectors; dist(x,q) denotes the distance between the vectors x and q. $w^i$ is the weighted value assigned to each feature component, and f(x) denotes the estimation result of the classifier with regard to the unlabelled image x, namely the distance between x and the user's intention.

Let P represent the already labeled images of positive samples and the enquiry image inputted by the user, and N represent the already labeled images of negative samples, therefore, P∩N=∅, L=P∪N. Based on these samples, the enquiry point q is as follows:

$$q = \frac{1}{|P|} \sum_{x_k \in P} x_k - \frac{1}{|N|} \sum_{x_k \in N} x_k \quad [10]$$

The weighted value $w^i$ of each feature component reflects the influence of this feature component on the aforementioned algorithm (classifier). As regards a certain feature component, if all images of positive samples have similar values, it is indicated that this feature component excellently captures the user's intention, so that the feature component should be of great importance in the calculation of the distance between the query point and the unlabelled image, that is, this feature component should have made a great contribution, and should hence be assigned with a greater weighted value. To the contrary, if the difference in value corresponding to the images of positive samples is relatively large, it is indicated that this feature component does not conform to the user's intention, so that this feature component can only make lesser contribution in the calculation of the distance between the query point and the unlabelled image, and should hence be assigned with a lesser weighted value. As regards a certain feature component, an inverse number of the square deviation of the value corresponding to the images of positive samples can be used as its weighted value, with the smaller the square deviation, the greater the weighted value, and vice versa.

Let $\{x_k, k=1, \ldots, |P|\}$ represent the eigenvector to which the images of positive samples correspond, $x_k^i, i=1, \ldots, d$ be the eigenvector of the image $x_k$, and $\sigma^i$ represent the square deviation of the collection $\{x_k^i, k=1, \ldots, |P|\}$ then:

$$\hat{w}^i = \frac{1}{\sigma^i} \quad [11]$$

The aforementioned weighted value is normalized to obtain the final weighed value:

$$w^i = \frac{\hat{w}^i}{\sum_{i=1}^{d} \hat{w}^i} \quad [12]$$

In the case there is only one positive sample, the square deviation is zero, at which time, each of the feature components uses the same weighted value.

Moreover, the classifying capability of the aforementioned classifier based on the weighted Euclidean distance model is relatively weak, and there usually are classification errors. To avoid this problem, a relatively conservative strategy can be employed in the embodiments of this invention, that is, the main learner merely makes use of the images with relatively small number (which can be determined in advance upon specific application and based on experience) and most irrelevant to the user's intention as outputted by the unlabelled image selector 4 to strengthen the training data collection of the main learner. In other words, the determination unit 402 merely determines the unlabelled images with relatively small number to provide to the main learner. Given the user's intention, most of the images in the image database are usually irrelevant, and only a small portion of the images is relevant. Accordingly, the images most irrelevant to the user's intention as obtained by the classifier are basically reliable.

In addition, as discussed above, it is also possible to employ another conservative strategy to further enhance the reliability, that is, the main learner only temporarily, rather than permanently, uses these unlabelled images. In other words, in each round of feedback, the calculation unit 401 bases on the images in the training data pool to dynamically perform the calculation. Consequently, the unlabelled images thus generated might be different in each round of feedback.

Figure 8:
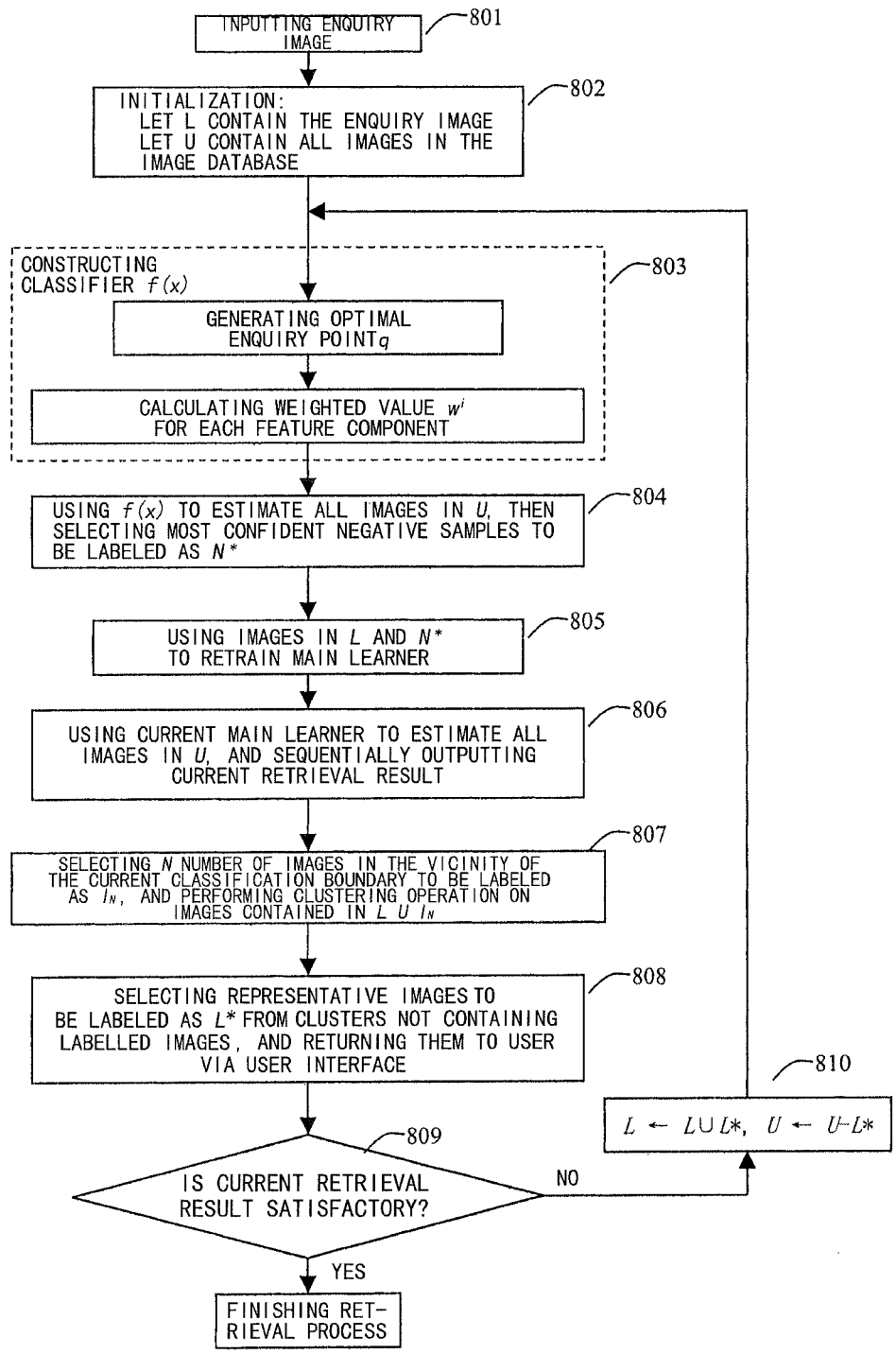
FIG. 8 is a flowchart showing the image retrieval method according to one embodiment of this invention.

FIG. 8 is a flowchart showing the image retrieval method according to one embodiment of this invention.

As the retrieval task begins, the user inputs the enquiry image via the user interface to express his intention (S801). The image retrieval apparatus stores the enquiry image into the training data pool. U is used to denote the unlabelled images, and corresponds to all images in the image database when the retrieval task begins (S802).

In accordance with the images in the training data pool, the retrieval apparatus constructs a classifier f(x) based on the weighted Euclidean distance model (S803). In order to construct the classifier, it is first necessary to calculate the enquiry point q, and calculate the weighted value $w^i$ of each feature component at the same time. It has been previously described as how to calculate the enquiry point q and how to calculate the weighted value, so no repetition is made here.

Subsequently in step 804, the classifier f(x) is used to estimate the images in U, namely calculating the distance between these images and the enquiry point q. The images having the greatest distance are regarded to be images most irrelevant to the user's intention, and labeled as N*. These images will be used to strengthen the training data collection of the main learner.

Subsequently, the images in the training data pool and the negative samples most irrelevant to the user's intention as outputted from f(x) are used to retrain the main learner (S805), namely making use of L and N* to train the main learner.

The main learner is used to estimate the images in U, and the retrieval result is returned via the user interface (S806), namely rearranging the database images according to the estimation result of the main learner.

Concurrently, the unlabelled images in the vicinity of the current classification boundary are selected, and clustered together with the images in the training data collection (S807). After the clustering operation, most representative images are selected from the clusters not containing the already labeled images and the enquiry image, labeled as L*, and returned to the user for labeling (S808).

If the user is satisfied with the current retrieval result (S809, YES), the retrieval operation can be stopped; otherwise (S809, NO), the user needs to label from the images L* as outputted by the active selector and enters the next round of feedback operation.

Before a new round of feedback operation starts, images contained in L* are deleted from U, and added in L. Moreover, the information, such as positive or negative samples, labeled by the user on the images in L* are stored together into the training data pool.

Be noted that the operational flow as mentioned above is directed to the image retrieval apparatus as shown in FIG. 1. The operational flows as regards the image retrieval apparatuses as shown in FIGS. 2 and 3 vary correspondingly. Taking for example the image retrieval apparatus 1' as shown in FIG. 2, steps 803 and 804 should be omitted, while as regards the image retrieval apparatus 1" as shown in FIG. 3, steps 807 and 808 should be omitted.

In view of the above, an exemplary embodiment provides an image retrieval apparatus, which comprises an unlabelled image selector for selecting one or more unlabelled image(s) from an image database; and a main learner for training in each feedback round of the image retrieval, estimating relevance of images in the image database and a user's intention, and determining retrieval results, wherein the main learner makes use of the unlabelled image(s) selected by the unlabelled image selector in the estimation.

In one embodiment, the image retrieval apparatus further comprises an active selector for selecting, in each feedback round and according to estimation results of the main learner, one or more unlabelled image(s) from the image database for the user to label.

In one embodiment, the unlabelled image selector uses a method different from the method used by the main learner to calculate the relevance of the images in the image database and the user's intention.

In one embodiment, the unlabelled image(s) selected by the unlabelled image selector is/are one or more image(s) most irrelevant to the user's intention.

In one embodiment, the unlabelled image selector uses a weighted Euclidean distance model to select the unlabelled image.

In one embodiment, the unlabelled image selector uses the weighted Euclidean distance model to generate a new query point in accordance with a labeled image and a query image inputted by the user, and takes the weighted Euclidean distance between the unlabelled images in the image database and the new query point as the estimation results of each unlabelled image in the image database.

In one embodiment, the unlabelled image selector uses the weighted Euclidean distance model and adopts an inverse number of a square deviation of the value of an image of positive example to which each component of an eigenvector corresponds as its weighted value.

In one embodiment, the unlabelled image selector only uses a predetermined number of images most irrelevant to the user's intention outputted by the weighted Euclidean distance model as images of negative examples to output to the main learner.

In one embodiment, the unlabelled image selector only takes images outputted according to the weighted Euclidean distance model and having a distance greater than a predetermined distance from the query point as images of negative examples to output to the main learner.

In one embodiment, the main learner re-trains in each feedback round in accordance with the following images: labeled images, query images inputted by the user, and images of negative examples outputted by the unlabelled image selector.

In one embodiment, the active selector comprises an information capacity measurement calculation unit and a selection unit, wherein the information capacity measurement calculation unit calculates the information capacity of each of the unlabelled images in the image database, and the selection unit selects the unlabelled images to be provided to the user for labeling in accordance with calculation results of the information capacity measurement calculation unit.

In one embodiment, the active selector comprises a representativeness measurement calculation unit and a selection unit, wherein the representativeness measurement calculation unit calculates the representativeness of each of the unlabelled images in the image database, and the selection unit selects the unlabelled images to be provided to the user for labeling in accordance with calculation results of the representativeness measurement calculation unit. Moreover, in one embodiment, the active selector further comprises an information capacity calculation unit.

In one embodiment, the information capacity measurement calculation unit calculates the information capacity of an image by calculating the distance between the image and a current classification boundary of the main learner.

In one embodiment, the representativeness measurement calculation unit comprises an image collector for determining the images to be clustered; a clustering device for partitioning the images determined by the image collector into a plurality of clusters; and an image selector for selecting the most representative images from the clusters obtained from the clustering device.

In one embodiment, the images collected by the image collector include query images inputted by the user, unlabelled images closer to the current classification boundary of the main learner, and labeled images.

In one embodiment, the clustering device uses a normalized cut method to accomplish the clustering process.

In one embodiment, the clustering device adaptively determines the number of clusters, that is, the number of clusters not containing the labeled images and query images is made to equal the number of images returned to the user for labeling.

In one embodiment, the image selector selects the representative images only from the clusters not containing the labeled images and query images.

One embodiment provides an image retrieval apparatus, which comprises a main learner for training in each feedback round of the image retrieval, estimating relevance of images in an image database and a user's intention, and determining retrieval results; an active selector for selecting, in each feedback round and according to estimation results of the main learner, one or more unlabelled image(s) from the image database for the user to label; and an output unit for outputting the retrieval results determined by the main learner and the one or more unlabelled image(s) selected by the active selector.

Moreover, in view of the above, an exemplary embodiment provides an image retrieval method, which comprises an unlabelled image selecting step for selecting one or more unlabelled image(s) from an image database; and a main learning step for estimating relevance of images in the image database and a user's intention in each feedback round of the image retrieval, and determining retrieval results, wherein the unlabelled image(s) selected by the unlabelled image selecting step is/are made use of in the estimation.

In one embodiment, the image retrieval method further comprise an actively selecting step for selecting, in each feedback round and according to estimation results of the main learning step, one or more unlabelled image(s) from the image database for the user to label.

In one embodiment, the unlabelled image selecting step uses a method different from the method used by the main learning step to calculate the relevance of the images in the image database and the user's intention.

In one embodiment, the unlabelled image(s) selected by the unlabelled image selecting step is/are one or more image(s) most irrelevant to the user's intention.

In one embodiment, the unlabelled image selecting step uses a weighted Euclidean distance model to select the unlabelled image.

In one embodiment, the unlabelled image selecting step uses the weighted Euclidean distance model to generate a new query point in accordance with a labeled image and a query image inputted by the user, and takes the weighted Euclidean distance between the unlabelled images in the image database and the new query point as the estimation results of each unlabelled image in the image database.

In one embodiment, the unlabelled image selecting step uses the weighted Euclidean distance model and adopts an inverse number of a square deviation of the value of an image of positive example to which each component of an eigenvector corresponds as its weighted value.

In one embodiment, the unlabelled image selecting step only uses a predetermined number of images most irrelevant to the user's intention outputted according to the weighted Euclidean distance model as images of negative examples to output to the main learning step.

In one embodiment, the unlabelled image selecting step only takes images outputted by the weighted Euclidean distance model and having a distance greater than a predetermined distance from the query point as images of negative examples to output to the main learning step.

In one embodiment, the main learning step re-trains in each feedback round in accordance with the following images: labeled images, query images inputted by the user, and images of negative examples outputted by the unlabelled image selecting step.

In one embodiment, the actively selecting step comprises an information capacity measurement calculating step and a selecting step, wherein the information capacity measurement calculating step calculates the information capacity of each of the unlabelled images in the image database, and the selecting step selects the unlabelled images to be provided to the user for labeling in accordance with calculation results of the information capacity measurement calculating step.

In one embodiment, the actively selecting step comprises a representativeness measurement calculating step and a selecting step, wherein the representativeness measurement calculating step calculates the representativeness of the unlabelled images in the image database, and the selecting step selects the unlabelled images to be provided to the user for labeling in accordance with calculation results of the representativeness measurement calculating step. Moreover, in one embodiment, the actively selecting step further comprises an information capacity measurement calculating step, wherein the information capacity measurement calculating step calculates the information capacity of the unlabelled images in the image database, and the selecting step selects the unlabelled images to be provided to the user for labeling in accordance with calculation results of the information capacity measurement calculating step and calculation results of the representativeness measurement calculating step.

In one embodiment, the information capacity measurement calculating step calculates the information capacity of an image by calculating the distance between the image and a current classification boundary determined by the main learning step.

In one embodiment, the representativeness measurement calculating step comprises an image collecting step for determining the images to be clustered; a clustering step for partitioning the images determined by the image collecting step into a plurality of clusters; and an image selecting step for selecting the most representative images from the clusters obtained from the clustering step.

In one embodiment, the images collected by the image collecting step include query images inputted by the user, unlabelled images closer to the current classification boundary determined by the main learning step, and labeled images.

In one embodiment, the clustering step uses a normalized cut method to accomplish the clustering process.

In one embodiment, the clustering step adaptively determines the number of clusters, that is, the number of clusters not containing the labeled images and query images is made to equal the number of images returned to the user for labeling.

In one embodiment, the image selecting step selects the representative images only from the clusters not containing the labeled images and query images.

In one embodiment, the image retrieval method comprises a main learning step for training in each feedback round of the image retrieval, estimating relevance of images in an image database and a user's intention, and determining retrieval results; an actively selecting step for selecting, in each feedback round and according to estimation results of the main learning step, one or more unlabelled image(s) from the image database for the user to label; and an outputting step for outputting the retrieval results determined by the main learning step and the one or more unlabelled image(s) selected by the actively selecting step.

In another exemplary embodiment, the aforementioned steps, elements, and component parts of the disclosure are combinable with one another.

The image retrieval apparatus and image retrieval method according to the an exemplary embodiment can be implemented by hardware, and can also be implemented by a common computer through execution of software programs.

According to one embodiment, there is provided a computer program enabling a computer to implement the following steps: an unlabelled image selecting step for selecting one or more unlabelled image(s) from an image database; and a main learning step for estimating relevance of images in the image database and a user's intention in each feedback round of the image retrieval, and determining retrieval results, wherein the unlabelled image(s) selected by the unlabelled image selecting step is/are made use of in the estimation. Resultantly, the computer program also enables the computer to perform the various steps in the aforementioned methods.

According to another embodiment, there is provided a computer readable medium storing a computer program thereon, for enabling a computer to perform the various steps in the aforementioned image retrieval methods, according to exemplary embodiments or to implement the various functions of the aforementioned image retrieval apparatuses, according to exemplary embodiments. The computer readable medium can be a floppy disk, a CD, a tape, a magneto optical disk, a DVD, a hard disk, an RAM or an ROM, etc., or any other information recording media known in the art.

As it's apparent to a person skilled in the art, various modifications and transformations can be made to this invention, without departing from the spirit or scope of the exemplary embodiments. Therefore, the disclosure is directed to cover these modifications and transformations as long as they fall within the scope as claimed in the claims or analogues thereof.

The invention claimed is:

1. An image retrieval apparatus, comprising:
   a main learner for training in each feedback round of the image retrieval, estimating relevance of images in an image database and a user's intention, and determining retrieval results;
   an active selector for selecting, in each feedback round and according to estimation results of the main learner, one or more unlabelled image(s) from the image database for the user to label; and
   an output unit for outputting the retrieval results determined by the main learner and the one or more unlabelled image(s) selected by the active selector;
   wherein, the active selector comprises an information capacity measurement calculation unit and a selection unit, the information capacity measurement calculation unit calculates information capacity of each of the unlabelled images in the image database, and the selection unit selects the unlabelled images to be provided to the user for labeling in accordance with calculation results of the information capacity measurement calculation unit.

2. An image retrieval apparatus, comprising:
   a main learner for training in each feedback round of the image retrieval, estimating relevance of images in an image database and a user's intention, and determining retrieval results;
   an active selector for selecting, in each feedback round and according to estimation results of the main learner, one or more unlabelled image(s) from the image database for the user to label;
   an output unit for outputting the retrieval results determined by the main learner and the one or more unlabelled image(s) selected by the active selector;
   wherein the active selector comprises a representativeness measurement calculation unit and a selection unit, wherein the representativeness measurement calculation unit calculates the representativeness of each of the unlabelled images in the image database, and the selection unit selects the unlabelled images to be provided to the user for labeling in accordance with calculation results of the representativeness measurement calculation unit.

3. The image retrieval apparatus according to claim 2, wherein the active selector further comprises an information capacity measurement calculation unit, wherein the information capacity measurement calculation unit calculates the information capacity of each of the unlabelled images in the image database, and the selection unit selects the unlabelled images to be provided to the user for labeling in accordance with calculation results of the information capacity measurement calculation unit and calculation results of the representativeness measurement calculation unit.

4. The image retrieval apparatus according to claim 3, wherein the information capacity measurement calculation unit calculates the information capacity of an image by calculating the distance between the image and a current classification boundary determined by the main learner.

5. The image retrieval apparatus according to claim 2 or 3, wherein the representativeness measurement calculation unit comprises:
   an image collector for determining the images to be clustered;
   a clustering device for partitioning the images determined by the image collector into a plurality of clusters; and
   an image selector for selecting the most representative images from the clusters obtained from the clustering device.

6. The image retrieval apparatus according to claim 5, wherein the images collected by the image collector include: query images inputted by the user, unlabelled images closer to the current classification boundary determined by the main learner, and labeled images.

7. The image retrieval apparatus according to claim 5, wherein the clustering device uses a normalized cut method to accomplish the clustering process.

8. The image retrieval apparatus according to claim 5, wherein the clustering device adaptively determines the number of clusters, that is, the number of clusters not containing the labeled images and query images is made to equal the number of images returned to the user for labeling.

9. The image retrieval apparatus according to claim 5, wherein the image selector selects the representative images only from the clusters not containing the labeled images and query images.

10. An image retrieval apparatus, comprising:
    a processor to execute:
       estimating, in each feedback round of image retrieval, a user's intention to select one or more images from an image database corresponding with a relevance determined for images in the image database,
       determining retrieval results of the estimating,
       selecting, in each feedback round corresponding with the retrieval results, one or more unlabelled image(s) for a user to label, and
       outputting the retrieval results and the one or more unlabelled image(s) selected;
    wherein, the processor further to execute calculating information capacity of each of the unlabelled images in the image database, and selecting the unlabelled images to be provided to the user for labeling in accordance with calculation results.

11. The image retrieval apparatus according to claim 10, wherein the relevance is determined in accordance with a classifier.

12. An image retrieval apparatus, comprising:
    a processor to execute:
    estimating, in each feedback round of image retrieval, a user's intention to select one or more images from an image database corresponding with a relevance determined for images in the image database,
    determining retrieval results of the estimating,
    selecting, in each feedback round corresponding with the retrieval results, one or more unlabelled image(s) for a user to label
    outputting the retrieval results and the one or more unlabelled image(s) selected;
    wherein, the processor further executes calculating representativeness of each of the unlabelled images in the image database, and selecting the unlabelled images to be provided to the user for labeling in accordance with calculation results.

* * * * *

UNITED STATES PATENT AND TRADEMARK OFFICE
CERTIFICATE OF CORRECTION

| | | |
|---|---|---|
| PATENT NO. | : 9,042,654 B2 | Page 1 of 1 |
| APPLICATION NO. | : 13/854575 | |
| DATED | : May 26, 2015 | |
| INVENTOR(S) | : Rujie Liu et al. | |

It is certified that error appears in the above-identified patent and that said Letters Patent is hereby corrected as shown below:

In the claims

Claim 4, Column 19, Line 55:

Delete "claim 3," and insert --claim 1 or 3,-- therefor.

Signed and Sealed this
Thirteenth Day of October, 2015

Michelle K. Lee
*Director of the United States Patent and Trademark Office*